(12) United States Patent
Wesanekar et al.

(10) Patent No.: US 11,010,543 B1
(45) Date of Patent: May 18, 2021

(54) SYSTEMS AND METHODS FOR TABLE EXTRACTION IN DOCUMENTS

(71) Applicant: FMR LLC, Boston, MA (US)

(72) Inventors: Aishwarya Vijay Wesanekar, Ghaziabad (IN); Subramaniam Vaithiyalingam, Chennai (IN); Deepak Venkatachalapathi, Chennai (IN); Seth Warren Brooks, Westwood, MA (US); Biju Kozhikode Kizhakhemadtil, Hingham, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/990,584

(22) Filed: Aug. 11, 2020

(51) Int. Cl.
*G06F 40/20* (2020.01)
*G06F 40/177* (2020.01)
*G06F 40/205* (2020.01)
*G06K 9/00* (2006.01)

(52) U.S. Cl.
CPC .......... *G06F 40/177* (2020.01); *G06F 40/205* (2020.01); *G06K 9/00449* (2013.01)

(58) Field of Classification Search
CPC .. G06K 9/00449; G06F 40/177; G06F 40/205
See application file for complete search history.

(56) References Cited

U.S. PATENT DOCUMENTS

| | | | |
|---|---|---|---|
| 6,006,240 A | 12/1999 | Handley | |
| 6,711,292 B2 | 3/2004 | Wang | |
| 8,443,278 B2 | 5/2013 | Mansfield et al. | |
| 9,235,756 B2 | 1/2016 | Ma | |
| 9,697,423 B1* | 7/2017 | Bellert | G06K 9/00416 |
| 2007/0140565 A1* | 6/2007 | Lin | G06K 9/00416 |
| | | | 382/203 |
| 2011/0002547 A1* | 1/2011 | Enomoto | G06K 9/00449 |
| | | | 382/195 |
| 2014/0369602 A1* | 12/2014 | Meier | G06K 9/6218 |
| | | | 382/182 |
| 2016/0117551 A1 | 4/2016 | Hausmann et al. | |
| 2017/0154025 A1 | 6/2017 | Déjean | |

(Continued)

FOREIGN PATENT DOCUMENTS

| | | |
|---|---|---|
| CN | 101833546 A | 9/2015 |
| CN | 107622041 A | 1/2018 |

(Continued)

*Primary Examiner* — Keith D Bloomquist
(74) *Attorney, Agent, or Firm* — Proskauer Rose LLP

(57) ABSTRACT

Computerized systems and methods for identifying a table in a document include: removing from a document content other than text characters and associated size, position and format information; converting each text character into a block covering the corresponding text character; converting each page of the document into a corresponding image file; drawing a set of horizontal lines spanning a width of the document, each block super-scored and under-scored by at least one of the horizontal lines; drawing a set of vertical lines spanning all or a portion of a length of the document; removing a subset of redundant vertical lines; and determining, based on the set of horizontal lines and the subset of vertical lines, (i) a set of table coordinates corresponding to a table in the document, and (ii) one or more sets of cell coordinates corresponding to one or more cells in the table.

24 Claims, 11 Drawing Sheets

(56) References Cited

U.S. PATENT DOCUMENTS

| | | | |
|---|---|---|---|
| 2017/0220858 A1* | 8/2017 | Stitz | G06F 40/177 |
| 2018/0276462 A1* | 9/2018 | Davis | G06K 9/342 |
| 2019/0266394 A1* | 8/2019 | Yu | G06K 9/00456 |
| 2019/0361972 A1* | 11/2019 | Lin | G06F 40/177 |

FOREIGN PATENT DOCUMENTS

| | | |
|---|---|---|
| CN | 108595402 A | 9/2018 |
| CN | 105988979 B | 11/2018 |

* cited by examiner

| | A | B | C | D | E | F | G | H | I | J | K | L | M | N |
|---|---|---|---|---|---|---|---|---|---|---|---|---|---|---|
| 1 | startX | startY | endX | endY | fontName | fontSize | fontWeight | fontSizeIn | isBold | isItalic | isUnderline | isStrikethrough | fontColor | text |
| 2 | 72.024 | 48.96002 | 120.3778 | 55.54478 | Arial-BoldMT | 14.04 | 700 | 14 | true | false | FALSE | false | DeviceGray | Boston |
| 3 | 120.1531 | 48.98002 | 174.7687 | 55.54478 | Arial-BoldMT | 14.04 | 700 | 14 | true | false | FALSE | false | DeviceGray | College |
| 4 | 174.74 | 48.96002 | 178.6431 | 55.54478 | Arial-BoldMT | 14.04 | 700 | 14 | true | false | FALSE | false | DeviceGray | |
| 5 | 72.024 | 63.12 | 148.032 | 68.74799 | Arial-BoldMT | 12 | 700 | 12 | true | false | FALSE | false | DeviceGray | Consolidated |
| 6 | 148.08 | 63.12 | 209.424 | 68.74799 | Arial-BoldMT | 12 | 700 | 12 | true | false | FALSE | false | DeviceGray | Statement |
| 7 | 209.45 | 63.12 | 224.114 | 68.74799 | Arial-BoldMT | 12 | 700 | 12 | true | false | FALSE | false | DeviceGray | of |
| 8 | 224.09 | 63.12 | 280.778 | 68.74799 | Arial-BoldMT | 12 | 700 | 12 | true | false | FALSE | false | DeviceGray | Activities |
| 9 | 280.85 | 63.12 | 284.186 | 68.74799 | Arial-BoldMT | 12 | 700 | 12 | true | false | FALSE | false | DeviceGray | |
| 10 | 72.024 | 76.91998 | 98.03499 | 82.54798 | Arial-BoldMT | 13 | 700 | 13 | true | false | FALSE | false | DeviceGray | Year |
| 11 | 98.028 | 76.91998 | 138.036 | 82.54798 | Arial-BoldMT | 12 | 700 | 12 | true | false | FALSE | false | DeviceGray | Ended |
| 12 | 138.086 | 76.91998 | 164.772 | 82.54798 | Arial-BoldMT | 13 | 700 | 13 | true | false | FALSE | false | DeviceGray | May |
| 13 | 164.66 | 76.91998 | 184.676 | 82.54798 | Arial-BoldMT | 13 | 700 | 13 | true | false | FALSE | false | DeviceGray | 31 |
| 14 | 184.772 | 76.91998 | 214.796 | 82.54798 | Arial-BoldMT | 12 | 700 | 12 | true | false | FALSE | false | DeviceGray | 2017 |
| 15 | 214.85 | 76.91998 | 218.186 | 82.54798 | Arial-BoldMT | 13 | 700 | 13 | true | false | FALSE | false | DeviceGray | |
| 16 | 72.024 | 90.85999 | 108.02 | 96.48798 | Arial-BoldMT | 12 | 700 | 12 | true | false | FALSE | false | DeviceGray | (with |
| 17 | 100.116 | 90.85999 | 173.472 | 96.48798 | Arial-BoldMT | 12 | 700 | 12 | true | false | FALSE | false | DeviceGray | summarized |
| 18 | 173.376 | 90.85999 | 225.396 | 96.48798 | Arial-BoldMT | 12 | 700 | 12 | true | false | FALSE | false | DeviceGray | financial |
| 19 | 225.42 | 90.85999 | 294.756 | 96.48798 | Arial-BoldMT | 12 | 700 | 12 | true | false | FALSE | false | DeviceGray | information |
| 20 | 294.792 | 90.85999 | 314.124 | 96.48798 | Arial-BoldMT | 13 | 700 | 13 | true | false | FALSE | false | DeviceGray | for |

Fig. 2F

H. Net Assets

Net assets consist of the following as of May 31, (in thousands)

| | Unrestricted | | Donor Restricted | | | |
|---|---|---|---|---|---|---|
| | | | Temporarily Restricted | | Permanently Restricted | |
| | 2017 | 2016 | 2017 | 2016 | 2017 | 2016 |
| Endowment net assets, beginning of year | $32,826 | $19,522 | $91,011 | $113,696 | $71,023 | $71,062 |
| Board designated $ | | | | | | |
| Donor restricted | | | 1,534 | 8,105 | 9,991 | 8,215 |
| Contributions, net of allowance | | | | | | |
| Investment return: | | | | | | |
| Investment income, net | 156 | 797 | (22) | 970 | (34) | (36) |
| Net gains (losses) | 11,031 | (403) | 16,994 | 56,195 | 619 | (97) |
| Total investment return | 1,080 | (403) | 16,972 | 57,273 | 585 | (93) |
| Appropriation of endowed assets for expenditure | (3,692) | (2,703) | (66,615) | (61,568) | | |
| Net assets reclassified or released from restrictions | 867 | 771 | 804 | 1,102 | 158 | 1,227 |
| Other losses | 1,272 | 167 | 1,654 | 837 | 1,067 | (246) |
| Endowment net assets, end of year | $66,873 | $33,826 | $197,304 | $91,011 | $101,795 | $71,028 |
| Board designated | | | | | | |
| Donor restricted | | | | | | |
| Designated for specific purposes | 191,864 | 84,401 | | | | |
| Net investment in plant | 406,329 | 428,752 | | | | |
| Program support | | | 6,990 | 6,973 | | |
| Contributions for plant assets | | | 49,727 | 115,613 | | |
| Student loans | | | 945 | 865 | | |
| Total net assets $ | 1,551,067 | 465,879 | 197,466 | 214,399 | 101,795 | 71,028 |

I. Retirement Programs

502  A computing device receives a document having one or more pages.

504  The computing device removes from the document content other than text characters and associated size, position and format information.

506  The computing device converts each text character into a block covering the corresponding text character, thereby generating a set of blocks.

508  The computing device convers each page of the document into a corresponding image file, thereby generating a set of document images including the set of blocks.

510  The computing device draws a set of horizontal lines spanning a width of the document, each block super-scored by at least one of the horizontal lines and under-scored by at least one of the horizontal lines.

512  The computing device draws a set of vertical lines spanning all or a portion of a length of the document, each vertical line beginning on one horizontal line and terminating on another horizontal line.

514  The computing device removes a subset of redundant vertical lines, thereby preserving a set of vertical lines that forms, in conjunction with the set of horizontal lines, a set of cells included in a set of rows, wherein each row encloses at least one text character.

516  The computing device determines, based on the set of horizontal lines and the subset of vertical lines, (i) a set of table coordinates corresponding to a table in the document, and (ii) one or more sets of cell coordinates corresponding to one or more cells in the table.

Fig. 5

SYSTEMS AND METHODS FOR TABLE EXTRACTION IN DOCUMENTS

TECHNICAL FIELD

This application relates generally to systems, methods and apparatuses, including computer programs, for machine processing of documents. More specifically, this application relates to extracting tabular data from documents using one or more computer processing techniques.

BACKGROUND

Documents that include data tables do not always have the data included in those tables available in structured form (e.g., in cases where the documents were stored as static files such as image scan files or "locked" PDF files). Certain processing operations require this data to be extracted in structured form before processing begins. One such situation occurs frequently in the municipal bonds market. Today, issuers of municipal bonds often create their bonds as static or locked form documents that do not make structured tabular data available to the holder. In addition, the municipal securities markets often issue their financial statements in locked PDF and scanned image form. As a result, capital markets and brokerages, which need to analyze the tabular data contained in these documents (e.g., as part of their risk assessments), must perform intensive pre-processing to re-create these tables in structured form before analyzing them.

Prior approaches to extracting this data automatically have utilized certain optical character recognition (OCR) techniques. However, when these techniques are applied to tabular data, they tend not to capture important information, e.g., formatting information, structural identification information and/or table identification information. Encoding issues can also be encountered when certain files (e.g., PDF files) are created using internal and/or custom encoding, instead of more conventional Unicode or ASCII encoding. In such cases, the retrieved text can appear in a garbled or incomprehensible form, and retrieval of text can fail using manual copy and pasting operations. As a result, conversion of static tabular data today is performed through a significant amount of manual work (e.g., human beings re-typing the information in structured tabular form). What is needed is a system that can scan static documents and identify tables automatically, outputting the tables in a structured form that is usable for a variety of types of further processing.

SUMMARY

Accordingly, the invention provides a framework, including computing systems, software, and associated computing methods and modules, for re-creating tabular data in a structured format that can be made available for further processing, analysis and/or storage. The invention can identify the structure of the table, including each cell that exists within the table, the text in each cell, associated formatting information, and the coordinates of the table and the individual cells. The invention can then piece this information together and store it in a uniform structured form (e.g., a JSON document), which can then be converted to any number of other common formats, such as Excel, HTML or XML. A "parser" module receives a document and removes content other than text characters and associated size, position and format information. An "extractor" module then identifies whether a table (e.g., a document structure having at least two columns and one row) exists in the document and determines its contents, storing them in a structured form. The identified tables can be stored together (e.g., in Elasticsearch) together with the original document. Metadata can be compiled including table coordinates, cell coordinates, and positions of corresponding items in the original document. In some cases, a PDFBox application programming interface (API) can identify the text according to the position coordinates information.

In one exemplary use scenario, a PDF document including one or more pages is loaded into memory with the dimensions of each page preserved. The text in the PDF document is then converted into individual blocks (e.g., solid black blocks having dimensions either exactly or approximately corresponding to the dimensions of the character, such as the same or similar width and height). The PDF document is then converted into an image. Horizontal lines are drawn below every line of text (represented by solid blocks), and vertical lines are drawn with a pre-specified periodicity, such as every two pixels, creating a fine grid over the document. (A horizontal line can also be drawn above the first line of text, so that one horizontal line can be situated above every line of text as well as below, e.g., to ensure that solid blocks are wrapped up in between horizontal lines from top as well as bottom.) Then, vertical lines that are determined to be "redundant" (e.g., lines that form empty cells with the immediately prior vertical line and the horizontal lines on which they terminate) are removed, such that only "optimum" vertical lines are retained. This optimization can be performed using one or more "sweeps", e.g., a left-to-right sweep followed by a right-to-left "sweep" aimed at removing redundant lines. The resulting grid forms a table having a set of rows and columns that define the table. Start and stop coordinates of the table can then be recorded in memory, together with the intersection coordinates of the table's cells. A data structure with this information can then be created (e.g., a JSON document), and a corresponding script (e.g., an HTML script) can be created and stored (e.g., in Elasticsearch) so that the table is amenable to further processing.

In one aspect, the invention features a computerized method of identifying a table in a document. The method includes receiving, by a computing device, a document having one or more pages. The method also includes removing, by the computing device, from the document, content other than text characters and associated size, position and format information. The method also includes converting, by the computing device, each text character into a block covering the corresponding text character, thereby generating a set of blocks. The method also includes converting, by the computing device, each page of the document into a corresponding image file, thereby generating a set of document images including the set of blocks. The method also includes drawing, by the computing device, a set of horizontal lines spanning a width of the document, each block super-scored by at least one of the horizontal lines and under-scored by at least one of the horizontal lines. The method also includes drawing, by the computing device, a set of vertical lines spanning all or a portion of a length of the document, each vertical line beginning on one horizontal line and terminating on another horizontal line. The method also includes removing, by the computing device, a subset of redundant vertical lines, thereby preserving a set of vertical lines that forms, in conjunction with the set of horizontal lines, a set of cells included in a set of rows, wherein each row encloses at least one text character. The method also includes determining, by the computing device, based on the set of horizontal lines and the subset of vertical lines, (i) a set of table coordinates corresponding to a table in the document, and (ii) one or more sets of cell coordinates corresponding to one or more cells in the table.

In some embodiments, the method includes determining, by the computing device, based on information in the document, size, position and format information for each text character. In some embodiments, the method includes combining, by the computing device, text characters into chunks based on the size, position and format information of each text character. In some embodiments, the method includes generating, by the computing device, a map of the chunks including consolidated size, position and format information for the chunks. In some embodiments, the method includes determining, by the computing device, based on the one or more sets of cell coordinates and the map of chunks, a subset of text for each cell defined by the set of cell coordinates. In some embodiments, the method includes generating, by the computing device, a structured JSON document including the cells defined by the one or more sets of cell coordinates and the subsets of text within the identified cells. In some embodiments, the method includes converting, by the computing device, the structured JSON document into a user-displayable document.

In some embodiments, the method includes drawing, by the computing device, a horizontal line in a top portion of the document, the horizontal line spanning a width of the document. In some embodiments, removing the subset of redundant vertical lines includes making a left to right sweep and a right to left sweep, each sweep removing redundant vertical lines that form empty cells together with the horizontal lines with which they intersect and a vertical line immediately prior in the sweep. In some embodiments, the set of table coordinates includes start and stop coordinates of the table. In some embodiments, the method includes generating, by the computing device, a table structure based on the table coordinates and the one or more sets of cell coordinates, the table structure reflecting the content of the table in the document. In some embodiments, each block covering the corresponding text character matches a width and a height of the corresponding text character. In some embodiments, the method includes optimizing the cells to be as similar as possible in at least one of linear width or height. In some embodiments, determining the table coordinates and the one or more sets of cell coordinates includes (i) creating matrices for intersection points of horizontal and vertical lines; and/or (ii) optimizing the intersection points to be as equidistant as possible and greater than M rows by N columns, wherein M and N are configurable numbers.

In some embodiments, the method includes removing from the document noise including at least one partial horizontal line, partial vertical line, partial background, partial watermark, or other non-text object in the document. In some embodiments, the computing device attempts to draw a horizontal line that does not intersect or overlay any block every X pixels vertically down the document, wherein X is a configurable number of pixels. In some embodiments, the computing device attempts to draw a vertical line that does not intersect or overlay any block every Y pixels horizontally across the document, wherein Y is a configurable number of pixels. In some embodiments, the format information includes information reflecting whether each text character includes italics, bold, underlining and color. In some embodiments, the document is a financial document. In some embodiments, the document is at least one of a static (e.g., text-parseable) PDF or a scanned document. In some embodiments, the method includes refining, by the computing device, via one or more language analysis techniques, the set of table coordinates and the one or more sets of cell coordinates.

In another aspect, the invention features a computerized system. The system includes a computing device configured to: receive a document having one or more pages; remove from the document content other than text characters and associated size, position and format information; convert each text character into a block covering the corresponding text character, thereby generating a set of blocks; convert each page of the document into a corresponding image file, thereby generating a set of document images including the set of blocks; draw a set of horizontal lines spanning a width of the document, each block super-scored by at least one of the horizontal lines and under-scored by at least one of the horizontal lines; draw a set of vertical lines spanning all or a portion of a length of the document, each vertical line beginning on one horizontal line and terminating on another horizontal line; remove a subset of redundant vertical lines, thereby preserving a set of vertical lines that forms, in conjunction with the set of horizontal lines, a set of cells included in a set of rows, wherein each row encloses at least one text character; and determine, based on the set of horizontal lines and the subset of vertical lines, (i) a set of table coordinates corresponding to a table in the document, and (ii) one or more sets of cell coordinates corresponding to one or more cells in the table. In some embodiments, the system includes a temporary data store in electronic communication with the computing device for storing the document images. In some embodiments, the temporary data store is configured to store at least one structured JSON, map of chunks, or visual representations.

Thus, the invention provides an easier way for tabular data to be automatically recognized, pre-processed, and stored in a form for further processing, and includes aspects such as: algorithms to draw horizontal and vertical lines; algorithms to identify symmetric table intersections; and/or algorithms to create structured JSON documents using cell-to-text position mapping. The invention can have numerous uses, e.g., (1) extracting financial statements from Comprehensive Annual Financial Reports; (2) extracting bank account statements; (3) extracting forms present in tabular structures; (4) extracting bordered, semi-bordered or borderless comparison tables; (5) extracting utility reports; (6) feeding information to for business knowledge graphs; (7) generating statistical reports from extracted figures; and/or (8) forming the training set of classifying columnar fields and row labels.

BRIEF DESCRIPTION OF THE DRAWINGS

The advantages of the invention described above, together with further advantages, may be better understood by referring to the following description taken in conjunction with the accompanying drawings. The drawings are not necessarily to scale; emphasis is instead generally placed upon illustrating the principles of the invention.

FIG. 2A is an illustration of an input document, according to an illustrative embodiment of the invention.

FIG. 2F is an illustration of a text chunk to position format map corresponding to the document of FIG. 2A, according to an illustrative embodiment of the invention.

FIG. 2G is an illustration of an extracted table with format information corresponding to the document of FIG. 2A, according to an illustrative embodiment of the invention.

FIG. 5 is a flow diagram of a method of identifying a table in a document, according to an illustrative embodiment of the invention.

DETAILED DESCRIPTION

Figure 1:
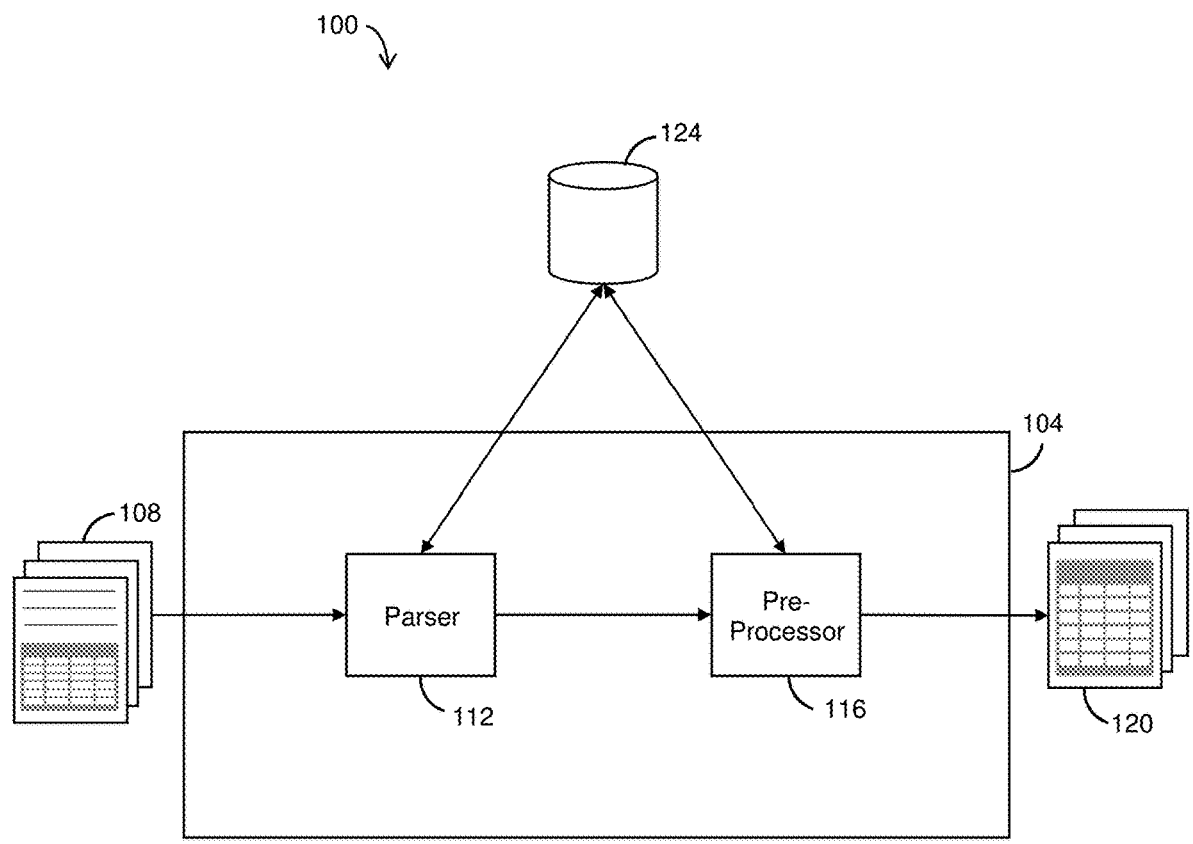
FIG. 1 is a schematic diagram of a computing system having a computing device for identifying a table in a document, according to an illustrative embodiment of the invention.

FIG. 1 is a schematic diagram of a computing system 100 having a computing device 104 (e.g., an extractor) for identifying a table in a document 108, according to an illustrative embodiment of the invention. The computing device 104 receives the document 108, which may have one or more pages. The computing device 104 then removes from the document 108 content other than text characters and associated size, position and format information. This task can be performed using one or more parsers, e.g., the parser 112. The computing device 104 then converts each text character into a block covering the corresponding text character, thereby generating a set of blocks. This task can be performed using one or more pre-processors, e.g., the pre-processor 116. The computing device 104 then converts each page of the document 108 into a corresponding image file 120, thereby generating a set of document images including the set of blocks. This task can also be performed using one or more pre-processors, e.g., the pre-processor 116.

The computing device 104 then begins a process of drawing initial lines in the document 108, and eventually removing redundant lines, which are used to define one or more tables extracted from the document 108. The computing device 104 draws a set of horizontal lines spanning a width of the document 108 (e.g., for each page in the document 108). Each block can be super-scored by at least one of the horizontal lines and under-scored by at least one of the horizontal lines. The computing device 104 then draws a set of vertical lines spanning all or a portion of a length of the document 108, each vertical line beginning on one horizontal line and terminating on another horizontal line. The computing device 104 then removes a subset of redundant vertical lines, thereby preserving a set of vertical lines that forms, in conjunction with the set of horizontal lines, a set of cells included in a set of rows. Each row can enclose at least one text character. This portion of the process causes the table to be extracted to take shape.

The computing device 104 then determines, based on the set of horizontal lines and the subset of vertical lines, (i) a set of table coordinates corresponding to a table in the document 108, and (ii) one or more sets of cell coordinates corresponding to one or more cells in the table. In some embodiments, the computerized system 100 includes a temporary data store 124 in electronic communication with the computing device 104 for storing the document images. In some embodiments, the temporary data store 124 is configured to store at least one structured JSON document, map of chunks, or visual representations. The various sets of coordinates can be stored in persistent or long-term memory as well (not shown) together with other information in the document reflecting the information in the table extracted, thereby forming a structured table that can be made available for further processing by a variety of purposes.

Figure 2A:
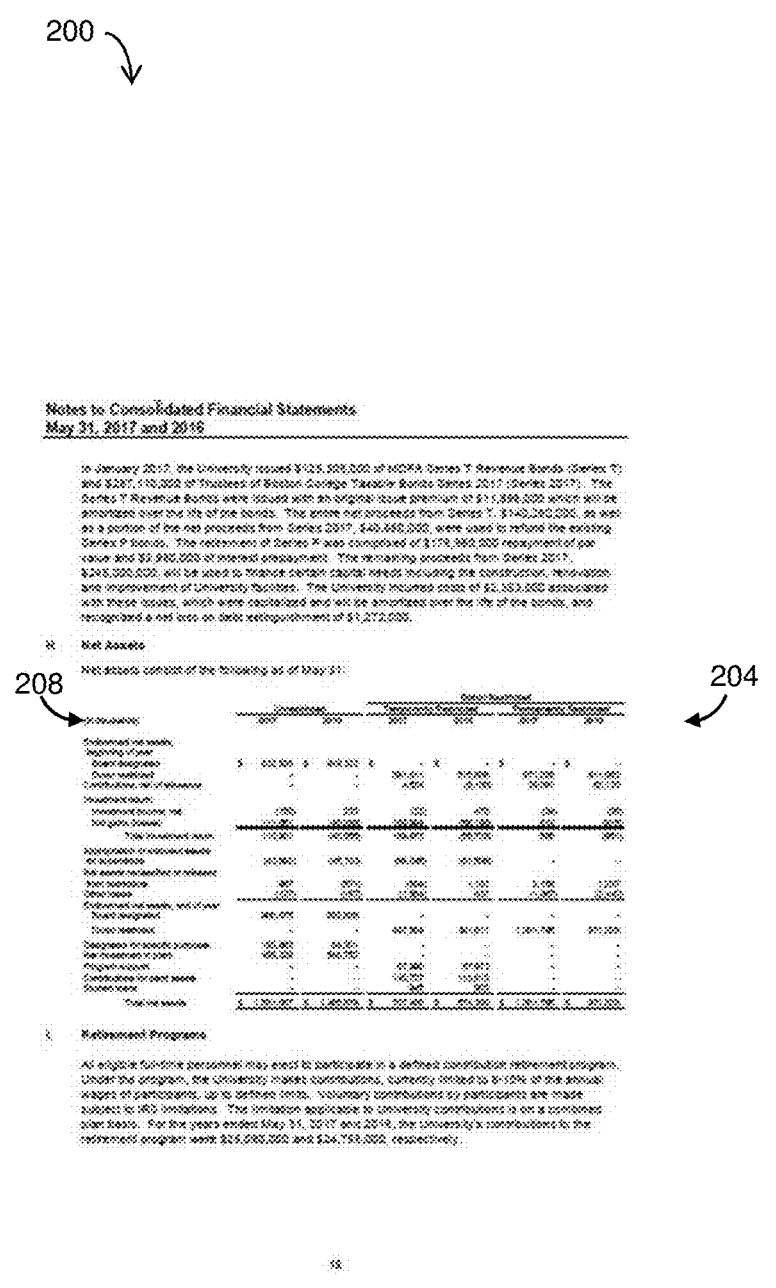
Figure 2B:
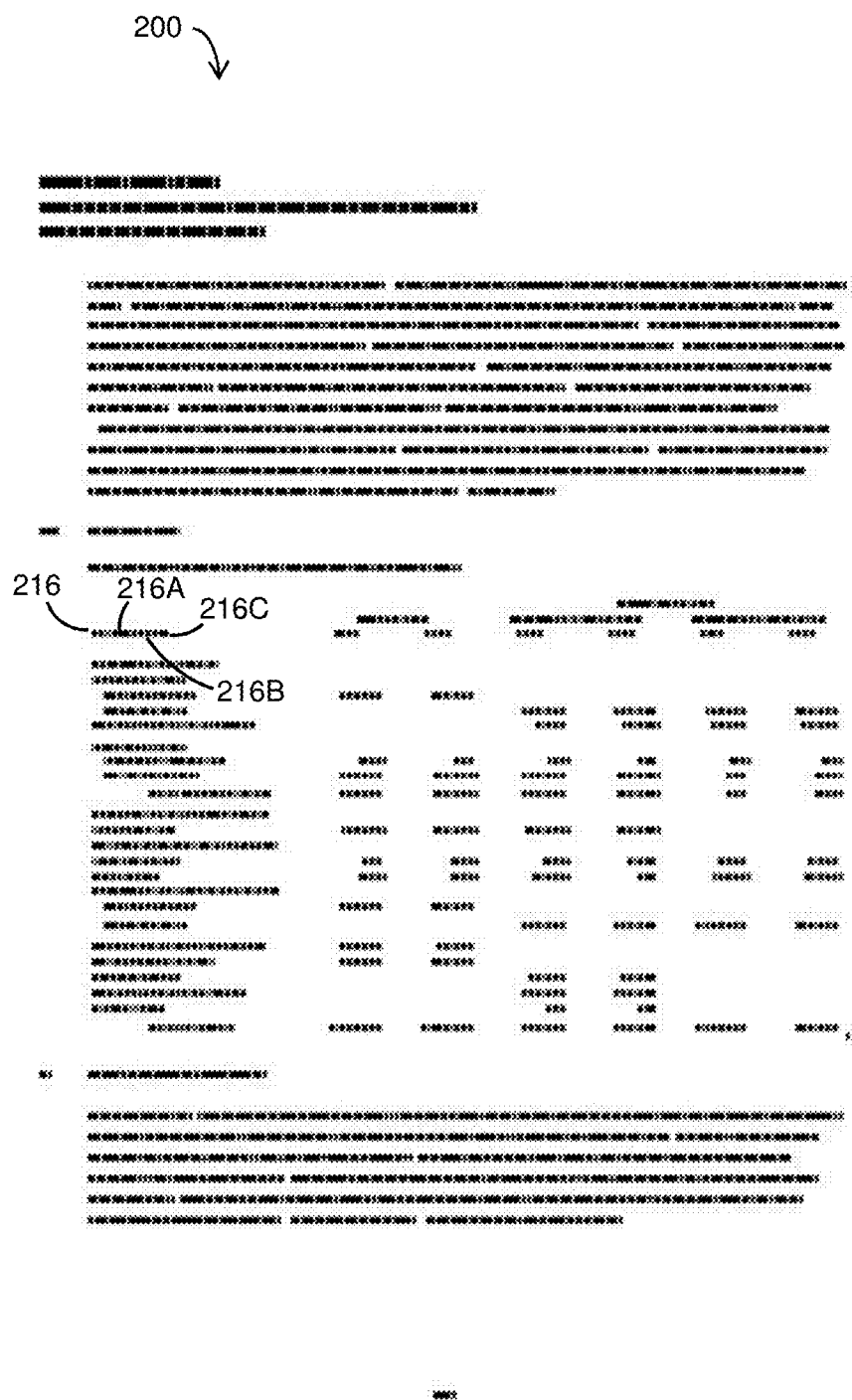
FIG. 2B is an illustration of the document of FIG. 2A with the text characters converted to blocks and stray material removed, according to an illustrative embodiment of the invention.

FIGS. 2A-2F illustrate in greater detail one example of how the above functions may operate in practice. FIG. 2A is an illustration of an exemplary input document 200. This input document 200 includes a table 204 having text characters 208 embedded with certain formatting information (e.g., underlining, etc.). In practice, most any document that is text-parseable and includes a table, with or without boundaries, can be processed in accordance with the invention. An image of each page of the input document 200 is created and saved in temporary storage (e.g., the temporary storage 124 shown in FIG. 1). In some embodiments, the exact dimensions of the page size can be conserved. In some embodiments, the text direction can be analyzed to determine if the page should be rotated. The computing device may remove "noise" so that only text is retained. For example, partial horizontal and vertical lines can be removed; objects in the page in the foreground and background can be removed; backgrounds and watermarks can be removed; and "salt and pepper" features (e.g., strings of continuous dots or full stops, with or without spaces in between) can be removed. In addition, content can be ensured to align in between horizontal lines (e.g., not rotated or skewed at an angle). At the end of the noise removal process, only text information with size, position, and other formatting information is retained.

FIG. 2B is an illustration of the document 200 of FIG. 2A with the text characters converted to blocks 216 (e.g., blocks 216A, 216B, 216C, etc.) and stray material removed. In this case, the blocks 216 are black solid blocks that have the dimensions and position (exactly or approximately) of the text characters on which they are based. To build the blocks, coordinate information can be obtained for each character and the blocks drawn accordingly. In this version of the document, the higher level structure and layout of the text characters are preserved on the page, but the individual text that exists within the original document is not visible.

Figure 2C:
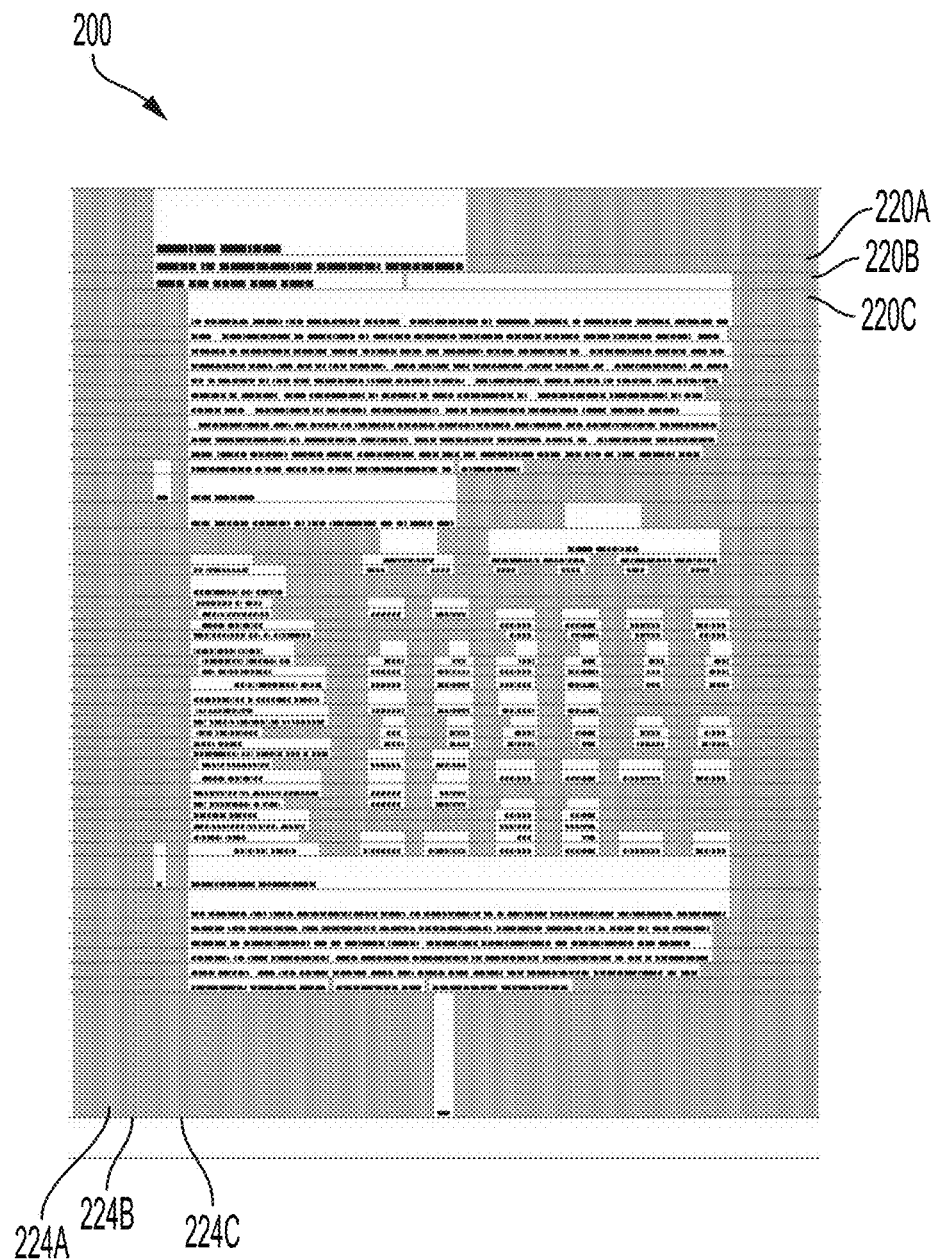
FIG. 2C is an illustration of the document of FIG. 2B with horizontal and vertical grid lines drawn, according to an illustrative embodiment of the invention.

FIG. 2C illustrates the first stage of the line drawing process described above. FIG. 2C shows the document 200 (e.g., the document of FIG. 2B) with horizontal grid lines 220 (e.g., 220A, 220B, 220C as shown) and vertical grid lines 224 (e.g., 224A, 224B, 224C as shown) superimposed. A horizontal line (e.g., the width of the whole page) is drawn below each line of solid blocks. (Note that a line below one block can constitute a line above another block, and a final horizontal line can be drawn at the top of the page as well, to ensure that all blocks have lines both above and below). These lines can be drawn by sweeping the document 200 from top to bottom and attempting to draw a horizontal line that does not intersect any solid block with a pre-defined periodicity (e.g., every three pixel stride in the sweep) that can be configurable based on the size or density of the text on the page. Once a horizontal line is drawn, another can be avoided until another solid block is encountered in the sweep. Vertical lines can then be drawn at a pre-determined interval, e.g., every two pixels, moving left to right, in all possible places given the text on the page. As shown, the vertical lines start and terminate on a horizontal line, making the vertical line as long as possible without encountering a solid block. This process can result in a fine mesh of grid lines enclosing the textual characters on the page.

Figure 2D:
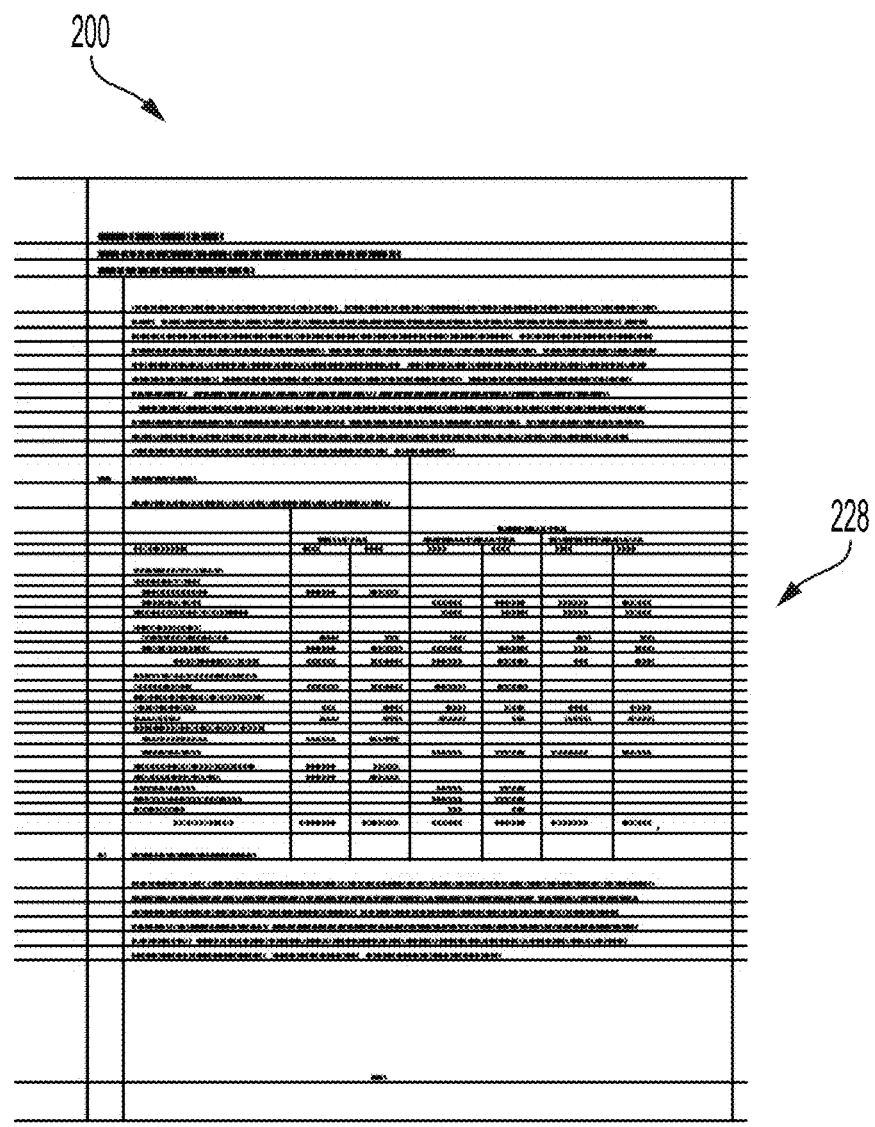
FIG. 2D is an illustration of the document of FIG. 2B with only optimized horizontal and vertical grid lines drawn, according to an illustrative embodiment of the invention.

FIG. 2D is an illustration of the document 200 of FIG. 2B with only optimized horizontal and vertical grid lines preserved, e.g., only those lines sufficient for visual recognition of the table and elimination of all other lines. Specifically, the line mesh of FIG. 2B has now been "trimmed" by performing left-to-right and right-to-left "sweep" operations in the previously drawn vertical lines. In one such sweep operation, a vertical line is removed if it and the vertical line immediately prior in the sweep form an empty cell (e.g., a cell enclosing no text) for each cell of the entire column formed. As shown in FIG. 2D, the lines preserved after the sweep operations now reveal defining lines of the table 228 to be generated.

Figure 2E:
FIG. 2E is an illustration of an extracted table corresponding to the document of FIG. 2A, according to an illustrative embodiment of the invention.

FIG. 2E is an illustration of the extracted table 232 corresponding to the document 200 of FIG. 2A (and the preserved lines of FIG. 2D). The table 232 is now in structured form and includes cells with coordinates corresponding to the optimized grid lines that were preserved after the sweeps were completed in FIG. 2D. In one exemplary process, all intersection points in the table are "iterated" over by creating a matrix reflecting intersection points. In this context, "iterating" over can refer to going over all the intersection points. Once all the intersections of horizontal and vertical lines are in place, the intersection points are iterated over to find the entire matrix. Based on the configurable threshold, a decision is made if the following table is a structure or not. A "maximum intersections procedure" with a configurable threshold of "m" rows and "n" columns can be implemented, where m and n can be configurable based on the density of the document. For example, intersection points that are equidistant and greater than 5 rows by 2 columns can be identified, and these numbers have historically worked well for certain financial statement documents. For other documents, a threshold of 10×10 can work well. Then, the four coordinates for both the larger table and each of the individual cells can be retained. All of this information can be written in a structured file, e.g., a JSON file for each page of the document. In addition, in each page's JSON file, each character's position can be analyzed and iterated over, together with its position, size and format information (italic, bold, underline, color). A relation can established between text and its associated formatting through the coordinate information and the "text chunk" discussed below.

FIG. 2F is an illustration of a "text chunk"-to-position format map 236 corresponding to the document of FIG. 2A, according to an illustrative embodiment of the invention. Chunks of characters are identified that have similar size and format information. The map 236 shows the determined text chunks and creates an association between text chunks and associated size and format information. For example, the map 236 shows, for each text chunk, start X coordinates, start Y coordinates, end X coordinates, end Y coordinates, font name, font size, font weight, font size in points, is bold, is italic, is underlined, is strikethrough, font color, and text. For every cell, textual information from the document is extracted and the entire table is populated along with format details. Based on the cell coordinates from visual structure recognition, the text in the region occupied by the cell can be found. The table and the text can be combined, creating a structured table with text and format information are put together, e.g., a JSON document. This structured table can be converted into a format that is easily represented visually, e.g., the HTML table 240 as shown in FIG. 2G or Excel or XML.

Figure 3:
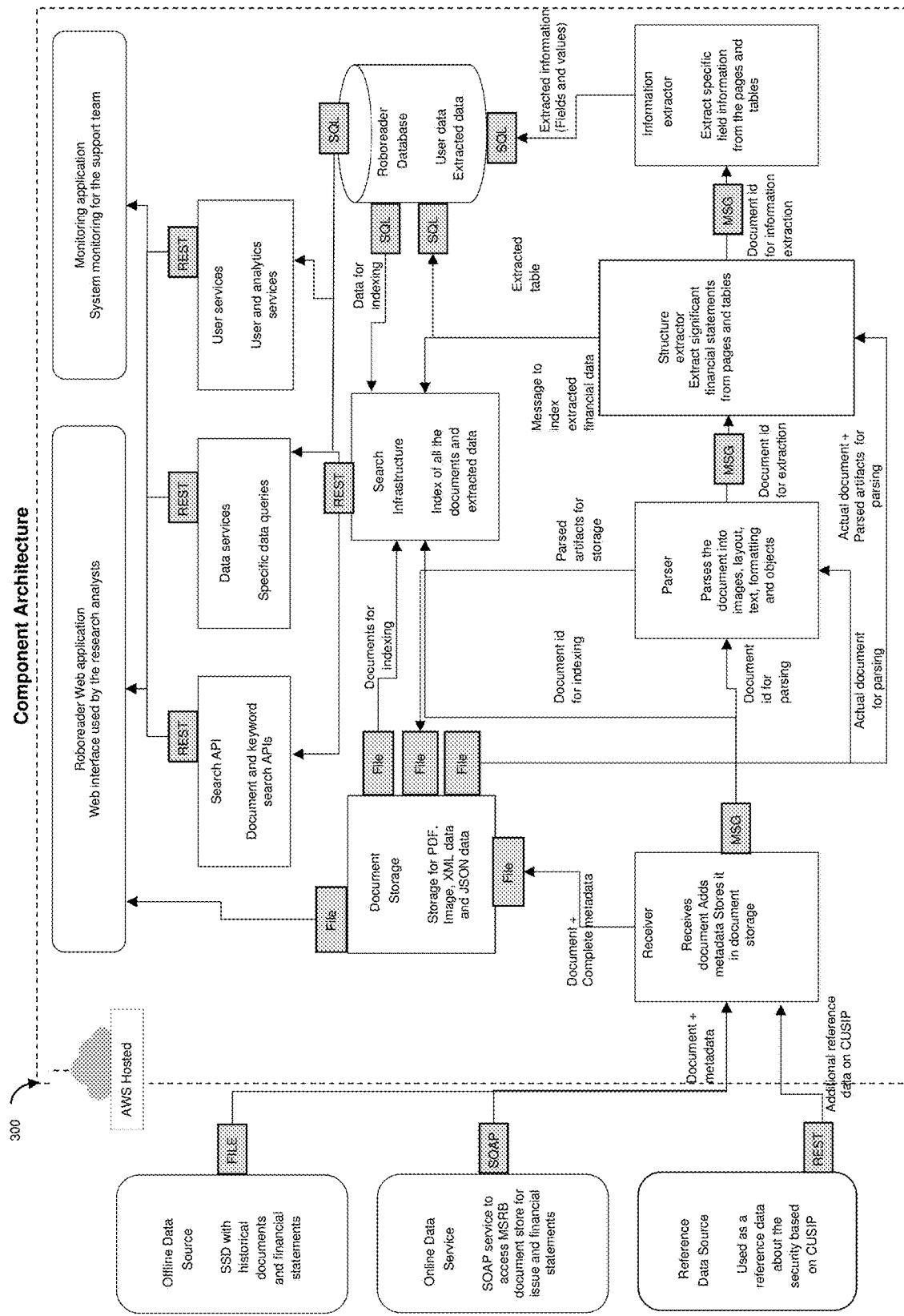
FIG. 3 is an illustration of an exemplary component architecture for a table identification system, according to an illustrative embodiment of the invention.

FIG. 3 is an illustration of an exemplary component architecture 300 for a table identification system, according to an illustrative embodiment of the invention. This component architecture 300 can includes similar components as the one shown in FIG. 1 and can perform the same basic functions as the one shown in FIG. 1 but depicts additional specialized components and modules. For example, in this embodiment, documents can be received from a variety of inputs (e.g., an Emma Archive data service, an Emma live service, and/or an asset management security reference data store) and enter a dedicated "receiver" module (implemented, e.g., in Java), which can receive the document, add metadata, store it in document storage, and send the document to the parse via a messaging service. In addition, this embodiment includes a search infrastructure, which can store all of the processed documents and extracted data in a searchable database (e.g., Elastic search) and be probed by one or more other modules (e.g., a search API, a data services module, a user services module, and/or a roboreader database).

Figure 4:
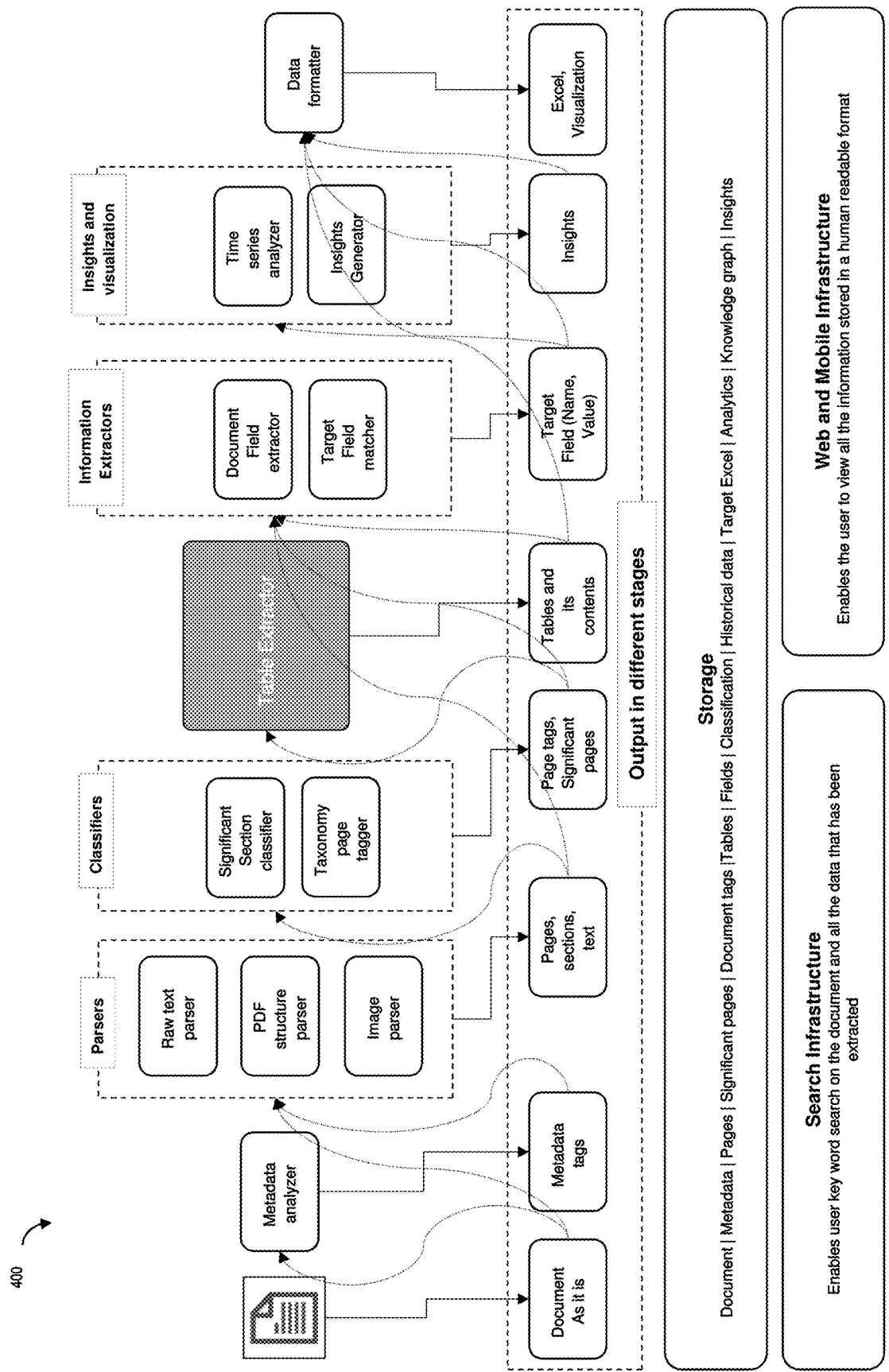
FIG. 4 is an illustration of an exemplary process flow diagram for a table identification system, according to an illustrative embodiment of the invention.

FIG. 4 is an illustration of an exemplary process flow diagram 400 for a table identification system, according to an illustrative embodiment of the invention. This process flow diagram 400 can achieve the same basic functionalities as the one shown and described in connection with FIG. 1 and can also include additional elements for performing more specialized functions within the computing device. For example, when a document is first received, it can be intercepted by a metadata analyzer, which can extract and/or store tags reflecting certain metadata in the document. The document can continue onto the parsers, which can be split into sub-parsers such as a raw text parser a PDF structure parser (for PDF documents), and/or an image parser, with each parser being separately responsible for extracting certain key document elements. The document can continue onto one or more classifiers, such as a significant section classifier, which can be used to identify one or more significant sections according to pre-defined criteria, and/or a taxonomy page tagger, which can be used to identify one or more significant pages according to pre-defined criteria. The document can continue onto the table extractor, which can function as one or more of the extractors described above. From that point the document can also flow to one or more information extractors (e.g., a document field extractor or a target field matcher), and/or one or more insights and visualization modules (e.g., a time series analyzer and/or an insights generator), which can be used to understand the data and make conclusions and/or compare different parameters and make a relevant decision (e.g., decide whether or not to invest in a financial bond). Finally, a specialized data formatter module can be used to prepare the document for visualization in formats such as Excel.

FIG. 5 is a flow diagram of a method 500 of identifying a table in a document, according to an illustrative embodiment of the invention. In a first step 502, a computing device receives a document having one or more pages. In a second step 504, the computing device removes from the document content other than text characters and associated size, position and format information. In a third step 506, the computing device converts each text character into a block covering the corresponding text character, thereby generating a set of blocks. In a fourth step 508, the computing device convers each page of the document into a corresponding image file, thereby generating a set of document images including the set of blocks. In a fifth step 510, the computing device draws a set of horizontal lines spanning a width of the document, each block super-scored by at least one of the horizontal lines and under-scored by at least one of the horizontal lines. In a sixth step 512, the computing device draws a set of vertical lines spanning all or a portion of a length of the document, each vertical line beginning on one horizontal line and terminating on another horizontal line. In a seventh step 514, the computing device removes a subset of redundant vertical lines, thereby preserving a set of vertical lines that forms, in conjunction with the set of horizontal lines, a set of cells included in a set of rows, wherein each row encloses at least one text character. In an eighth step 516, the computing device determines, based on the set of horizontal lines and the subset of vertical lines, (i) a set of table coordinates corresponding to a table in the document, and (ii) one or more sets of cell coordinates corresponding to one or more cells in the table. In some embodiments, the method includes further refining, by the computing device, via one or more language analysis techniques, the set of table coordinates and the one or more sets of cell coordinates. For example, two separate words can be merged by finding "connecting words" such as "and" or "for" between two row labels or column headers; and/or sentences can be removed from the table through natural language processing (NLP) techniques like sentence boundary detection.

Certain testing of the invention was performed to demonstrate its efficacy in comparison to manual processing techniques. A selection of 39,438 documents was chosen for table extraction, and a total of 201,066 tables were processed. The documents were financial documents sourced from a vendor (e.g., balance sheets, cash flow statements and income statements). These documents were uploaded onto an internet server, and from there were picked up for table extraction processing. In this setup, the invention took a total of 2,860 hours to process the tables in these documents, or about 51.2 seconds per table. By comparison, generally one research analyst takes about 15 minutes to populate one table in an Excel document. As a result, processing efficiency can be drastically increased by the invention. For example, every year 2,000 issuers analyze five years of data containing three financial statements (tables) each, which means that 30,000 tables need to be processed. That task could take over 300 days to perform manually by research analysts, as opposed to less than 20 days to perform by the computing device described herein. Therefore, the entire process may take less than 6 percent of the total time taken using a manual process in place today.

The above-described techniques can be implemented in digital and/or analog electronic circuitry, or in computer hardware, firmware, software, or in combinations of them. The implementation can be as a robot; as a computer program product, i.e., a computer program tangibly embodied in a machine-readable storage device, for execution by, or to control the operation of, a data processing apparatus, e.g., a programmable processor, a computer, and/or multiple computers; or as both. Method steps can be performed by one or more processors executing a computer program to perform functions of the invention by operating on input data and/or generating output data.

To provide for interaction with a user, the above described techniques can be implemented on a computing device in communication with a display device, e.g., a plasma or LCD (liquid crystal display) monitor or a mobile computing device display or screen for displaying information to the user and a keyboard and a pointing device, e.g., a mouse, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

In some embodiments, software elements used include Python (e.g., Python 2.7), Hadoop distribution, and/or PyQT. In some embodiments, hardware elements used include a computing system and Hadoop cluster nodes. In some embodiments, data sources used including databases storing customer chat interactions phone transcripts, and/or web search queries.

It should also be understood that various aspects and embodiments of the technology can be combined in various ways. Based on the teachings of this specification, a person of ordinary skill in the art can readily determine how to combine these various embodiments. In addition, modifications may occur to those skilled in the art upon reading the specification.

What is claimed is:

1. A computerized method of identifying a table in a document, the method comprising:
   receiving, by a computing device, a document having one or more pages;
   removing, by the computing device, from the document, content other than text characters and associated size, position and format information;
   converting, by the computing device, each text character into a block covering the corresponding text character, thereby generating a set of blocks;
   converting, by the computing device, each page of the document into a corresponding image file, thereby generating a set of document images including the set of blocks and not including extracted table area;
   drawing, by the computing device, on each document image, a set of horizontal lines spanning a width of the document image, each block super-scored by at least one of the horizontal lines and under-scored by at least one of the horizontal lines;
   drawing, by the computing device, on each document image, a set of vertical lines spanning all or a portion of a length of the document image, each vertical line beginning on one horizontal line and terminating on another horizontal line;
   removing, by the computing device, from each document image, a subset of redundant vertical lines, thereby preserving a set of vertical lines that forms, in conjunction with the set of horizontal lines, a set of cells included in a set of rows, wherein each row encloses at least one text character; and
   determining, by the computing device, from each document image, based on the set of horizontal lines and the subset of vertical lines, (i) a set of table coordinates corresponding to a table in the document, and (ii) one or more sets of cell coordinates corresponding to one or more cells in the table.

2. The method of claim 1 further including:
   determining, by the computing device, based on information in the document, size, position and format information for each text character;
   combining, by the computing device, text characters into chunks based on the size, position and format information of each text character; and
   generating, by the computing device, a map of the chunks including consolidated size, position and format information for the chunks.

3. The method of claim 2 further including determining, by the computing device, based on the one or more sets of cell coordinates and the map of chunks, a subset of text for each cell defined by the set of cell coordinates.

4. The method of claim 3 further including generating, by the computing device, a structured JSON document including the cells defined by the one or more sets of cell coordinates and the subsets of text within the identified cells.

5. The method of claim 4 further including converting, by the computing device, the structured JSON document into a user-displayable document.

6. The method of claim 1 further including drawing, by the computing device, a horizontal line in a top portion of the document, the horizontal line spanning a width of the document.

7. The method of claim 1 wherein removing the subset of redundant vertical lines includes making a left to right sweep and a right to left sweep, each sweep removing redundant vertical lines that form empty cells together with the horizontal lines with which they intersect and a vertical line immediately prior in the sweep.

8. The method of claim 1 wherein the set of table coordinates includes start and stop coordinates of the table.

9. The method of claim 1 further including generating, by the computing device, a table structure based on the table coordinates and the one or more sets of cell coordinates, the table structure reflecting the content of the table in the document.

10. The method of claim 1 wherein each block covering the corresponding text character matches a width and a height of the corresponding text character.

11. The method of claim 1 further including optimizing the cells to be as similar as possible in at least one of linear width or height.

12. The method of claim 1 wherein determining the table coordinates and the one or more sets of cell coordinates includes (i) creating matrices for intersection points of horizontal and vertical lines; and (ii) optimizing the intersection points to be as equidistant as possible and greater than M rows by N columns, wherein M and N are configurable numbers.

13. The method of claim 1 further including removing from the document noise including at least one partial horizontal line, partial vertical line, partial background, partial watermark, or other non-text object in the document.

14. The method of claim 1 wherein the computing device attempts to draw a horizontal line that does not intersect or overlay any block every X pixels vertically down the document, wherein X is a configurable number of pixels.

15. The method of claim 1 wherein the computing device attempts to draw a vertical line that does not intersect or overlay any block every Y pixels horizontally across the document, wherein Y is a configurable number of pixels.

16. The method of claim 1 wherein the format information includes information reflecting whether each text character includes italics, bold, underlining and color.

17. The method of claim 1 wherein the document is a financial document.

18. The method of claim 1 wherein the document is at least one of a static PDF or a scanned document.

19. The method of claim 1 further including further refining, by the computing device, via one or more language analysis techniques, the set of table coordinates and the one or more sets of cell coordinates.

20. The method of claim 1 wherein all lines in the set of vertical lines do not intersect any block in the set of blocks.

21. A computerized system including:
   a computing device configured to:
      receive a document having one or more pages;
      remove from the document content other than text characters and associated size, position and format information;
      convert each text character into a block covering the corresponding text character, thereby generating a set of blocks;

convert each page of the document into a corresponding image file, thereby generating a set of document images including the set of blocks and not including extracted table area;

draw, on each document image, a set of horizontal lines spanning a width of the document image, each block super-scored by at least one of the horizontal lines and under-scored by at least one of the horizontal lines;

draw, on each document image, a set of vertical lines spanning all or a portion of a length of the document image, each vertical line beginning on one horizontal line and terminating on another horizontal line;

remove, from each document image, a subset of redundant vertical lines, thereby preserving a set of vertical lines that forms, in conjunction with the set of horizontal lines, a set of cells included in a set of rows, wherein each row encloses at least one text character; and determine, for each document image, based on the set of horizontal lines and the subset of vertical lines, (i) a set of table coordinates corresponding to a table in the document, and (ii) one or more sets of cell coordinates corresponding to one or more cells in the table.

22. The system of claim 21 wherein all lines in the set of vertical lines do not intersect any block in the set of blocks.

23. The system of claim 22 further including a temporary data store in electronic communication with the computing device for storing the document images.

24. The system of claim 23 wherein the temporary data store is configured to store at least one structured JSON, map of chunks, or visual representations.

* * * * *